Figure 3:
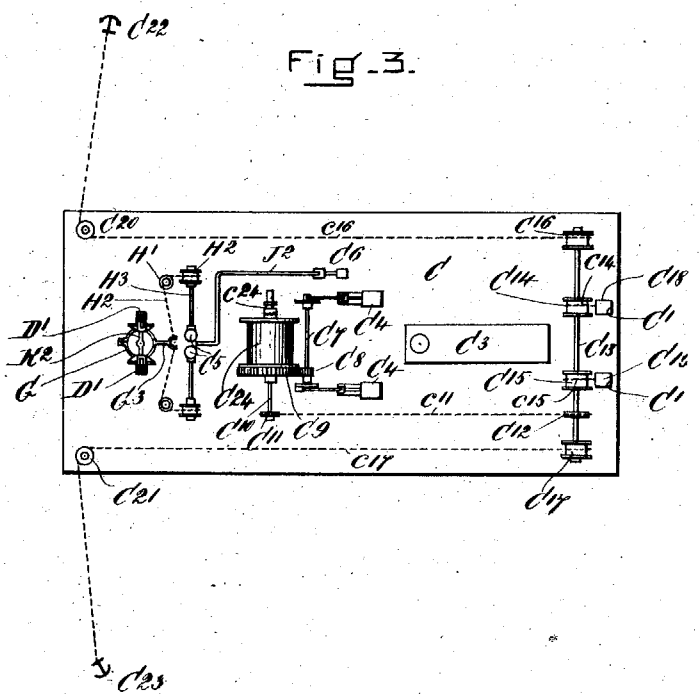

No. 12,501. REISSUED JUNE 26, 1906.
B. H. COFFEY.
SUBAQUEOUS ROCK BREAKER.
APPLICATION FILED MAY 14, 1906.
3 SHEETS—SHEET 1.
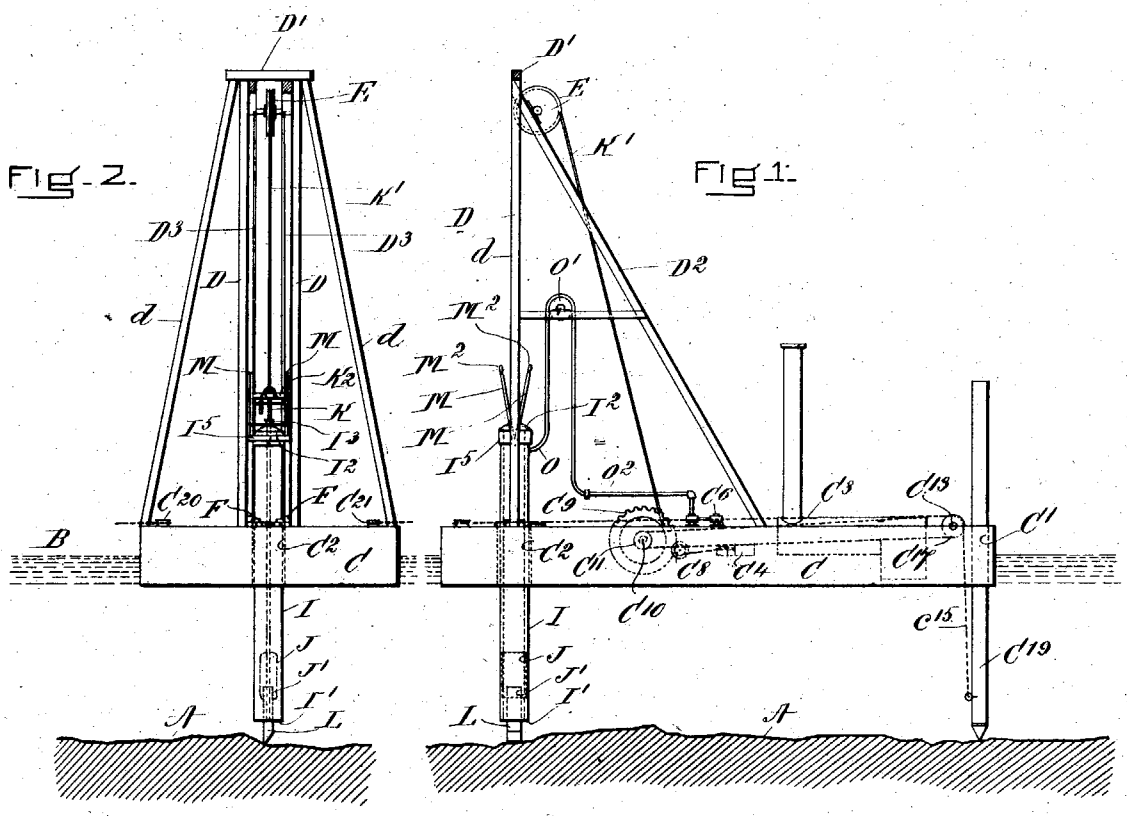
WITNESSES:
Frank G. Parker
Geo. L. Whitbeck
INVENTOR:
Barton H. Coffey
by Messimer & Campbell
his Attorneys No. 12,501. REISSUED JUNE 26, 1906.

B. H. COFFEY.

SUBAQUEOUS ROCK BREAKER.

APPLICATION FILED MAY 14, 1906.

3 SHEETS—SHEET 2.

WITNESSES:

Frank G. Parker

Geo. F. Wheelock

INVENTOR:

Barton H. Coffey by Messmer & Campbell his Attorneys

No. 12,501. REISSUED JUNE 26, 1906.

B. H. COFFEY.

SUBAQUEOUS ROCK BREAKER.

APPLICATION FILED MAY 14, 1906.

3 SHEETS—SHEET 3.

WITNESSES:

Frank G. Parker

Geo. E. Wheelock

INVENTOR:

Barton H. Coffey by Messimer & Campbell his Attorneys

UNITED STATES PATENT OFFICE.

BARTON H. COFFEY, OF ELIZABETH, NEW JERSEY, ASSIGNOR, BY MESNE ASSIGNMENTS, TO L. K. McCLYMONDS, OF SOUTH ORANGE, NEW JERSEY.

SUBAQUEOUS ROCK-BREAKER.

No. 12,501. Specification of Reissued Letters Patent. Reissued June 26, 1906.

Original No. 657,515, dated September 11, 1900. Application for reissue filed May 14, 1906. Serial No. 316,887.

*To all whom it may concern:*

Be it known that I, BARTON H. COFFEY, a citizen of the United States of America, residing in the city of Elizabeth, in the State of New Jersey, have invented a certain new and useful Improvement in Subaqueous Rock-Breakers, of which the following is a true and exact description, reference being had to the accompanying drawings, which form a part thereof.

My invention relates to the class of subaqueous rock-breaking machinery in which a heavily-weighted chisel is impelled, generally by its own weight, against the rock for the purpose of splitting and chipping it away. Apparatus of this kind has been used with great success before my present invention in shallow water and with the necessary impulse given to the chisel either through its own weight or through a detached weight striking the chisel; but it has been found that a condition of successful use is the depth of water through which the chisel falls, the friction and resistance of the water rapidly impairing the efficiency of the apparatus as the depth increases.

The object of my invention is to provide a rock-breaker which can be used in deep as well as shallow water, and the leading feature of my invention as embodied in the hereinafter-described apparatus consists in the provision of a tubular caisson closed at top and open at the bottom, means for forcing compressed air into the caisson to keep it substantially free from water, and rock-breaking chisel, together with mechanism for operating it, working in the caisson. The purpose of the caisson is to afford a tubular shell from which water may be excluded. The preferred means for excluding the water is by closing the upper end of the caisson and forcing air into the same at the top. The rock-breaking chisel will be movable relatively to the shell, so that it may transmit rock-breaking energy to the rock. Mechanism for operating the chisel will be a weight sufficiently heavy to accumulate rock-breaking energy in its movements within the shell, together with mechanical parts for causing the weight to work up and down or reciprocate within the shell for developing rock-breaking momentum. The weight is arranged to engage the rock-breaking chisel and operate it to break the rock, and, as before stated, the weight will generally be attached to the chisel—*e. g.*, in the manner shown—so as to substantially form part of the chisel, whereby the latter will be operated or impelled by its own weight. By this arrangement it will be readily understood I completely avoid all material resistance to the fall of the weighted chisel, and thus insure its striking the rock at the bottom of the caisson with maximum force and efficiency.

The invention consists in a rock-breaking apparatus wherein is employed a tubular shell, such as a caisson-tube, that is provided with means for keeping it substantially free from water during the rock-breaking operation, together with a chisel of such weight as to withstand the shocks incident to rock-breaking, the chisel being connected with the other parts, but in such a way as to permit movement relatively to the caisson or tube, and a movable weight working by suitable mechanism within the shell or such portion of the shell as is kept free from water, for the purpose of developing momentum and causing this energy to be transmitted through the chisel to the rock.

Other features of my invention will be best understood as described in connection with the drawings, in which they are illustrated and in which one form of embodying my invention is disclosed.

Figure 7:
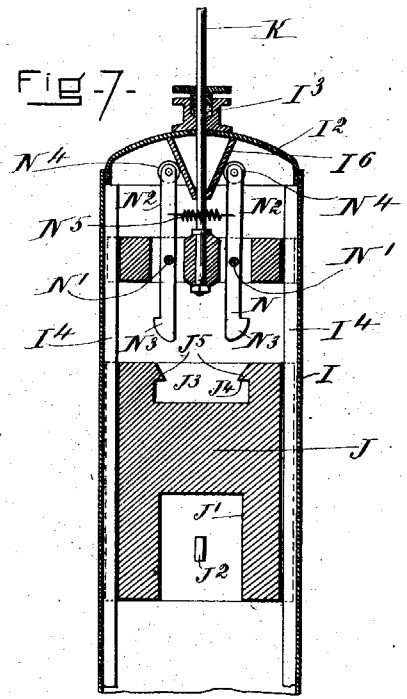
Figure 4:
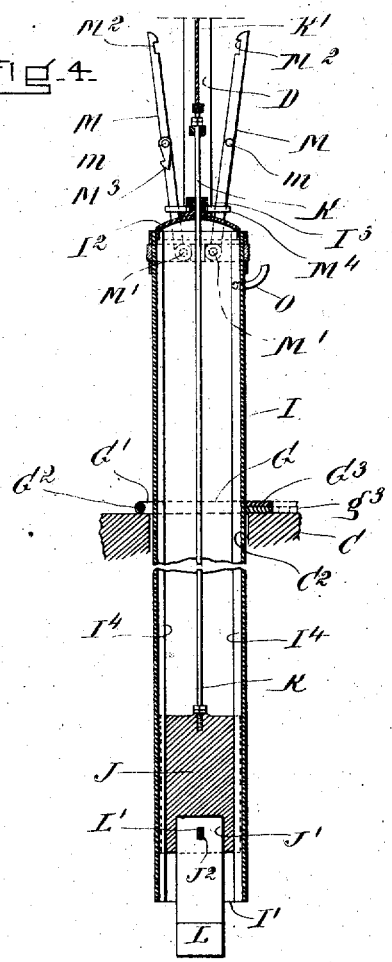
Figure 5:
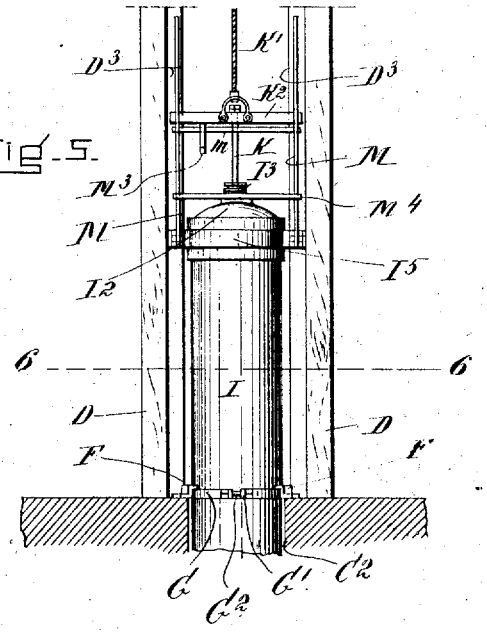
Figure 6:
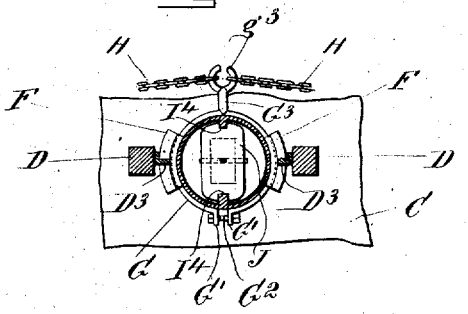

Figure 1 is a side elevation of a float such as is commonly used in dredging, showing my approved apparatus in connection therewith. Fig. 2 is a front view of the float and attachments; Fig. 3, a plan view thereof; Fig. 4, a longitudinal sectional elevation of the caisson and parts connected therewith, the chisel being shown connected with its operating-weight and carried by the latter; Fig. 5, an elevation taken at right angles to that shown in Fig. 4, showing the upper part of the caisson, portions of the derrick, and the clamp by which the caisson is attached to the float. Fig. 6 is a plan view taken on the horizontal section 6 6 of Fig. 5, and Fig. 7 is a sectional elevation of the top of a caisson, showing certain modifications in the construction of the chisel-carrying weight and mechanism for acting upon the weight.

A, Figs. 1 and 2, indicates the rock to be broken.

B is the water-level.

C is the float, which, as shown, is formed at its stern with two openings C′ C′, through which pass spuds $C^{19}$, used for anchoring the float in place. $C^2$ indicates another vertical passage through the bow of the boat provided for the passage of my tubular caisson.

At $C^3$ is indicated the fire-box, boiler, and stack.

$C^4$ $C^4$ indicate steam-engines which, as shown, are horizontal.

$C^5$ indicates a vertical steam-engine, and $C^6$ an air-compressor.

$C^7$ is a shaft acted on by the engines $C^4$ $C^4$ and having attached to it a gear-wheel $C^8$, engaged with a gear-wheel $C^9$, attached in turn to a shaft $C^{10}$. I have indicated at $C^{11}$ a pulley on the shaft $C^{10}$, connected by means of a chain or belt (indicated at $c^{11}$) with a pulley $C^{12}$, attached to a shaft $C^{13}$, to which shaft are attached drums $C^{14}$ and $C^{15}$, acting through chains $c^{14}$ $c^{15}$ on the spuds $C^{18}$ $C^{19}$, either of which can be drawn up at will. $C^{16}$ and $C^{17}$ are also drums attached to the shaft $C^{13}$ and connected by ropes or chains $c^{16}$ and $c^{17}$, passing over pulleys $C^{20}$ and $C^{21}$, with anchors $C^{22}$ and $C^{23}$. It will be understood, of course, that the drums are all detachably connected with the shafts, so that any one or more of them can be thrown into gear at will with the purpose of raising either of the spuds or of swinging the boat from side to side.

$C^{24}$ is a hoisting-drum journaled on the shaft $C^{10}$ and connected to be driven by said shaft at will, as by means of a clutch, (indicated at $c^{24}$.)

D D, *d d* D, and $D^2$ $d^2$ indicate parts of a derrick erected on the boat, the vertical members D D extending up on each side of the stay $D^2$ and being, as shown, provided with guides $D^3$ $D^3$.

E is a pulley secured at the top of the derrick, and F F segmental guide-clamps secured to the deck of the float on opposite sides of the opening $C^2$.

G is a split clamp-ring, the outer edge of which fits under the circular guide-clamps F F, while the inner face of the ring is adapted to clamp the caisson, to be hereinafter described. As shown, the split end of the ring is made with the expanding flanges G′ G′, which are drawn together, as by means of a bolt $G^2$.

$G^3$ is a lever-arm extending from the clamp-ring and connected, as by the split eye $g^3$, to chains H H, which, as shown in Fig. 3, run over pulleys H′ H′ to drums $H^2$ $H^2$, secured on shafts $H^3$ $H^3$, actuated by the steam-engine cylinders, (indicated at $C^5$.) By means of this device the clamp can be turned from side to side or held in any desired position.

I indicates the tubular caisson, the lower end I′ of which is open, while the upper end $I^2$ is tightly closed, having, as shown, at its center a stuffing-box $I^3$ for the actuating-rod to pass through. The caisson is formed with guides (indicated at $I^4$ $I^4$) on opposite sides and is preferably provided at its upper end with a ring $I^5$, arranged to turn freely on the caisson, but to move longitudinally with it. As shown in Fig. 7, the caisson is also provided with a wedge-like inwardly-projecting device, (indicated at $I^6$;) but this is a particular detail of the modification illustrated in said figure and hereinafter described.

J is the weight, vertically movable in the caisson and constructed at its lower end so as to engage a heavy rock-breaking chisel. This is for the purpose of transmitting the momentum gained by the weight through the chisel to the rock, and therefore it is important that the chisel and weight should be engaged while the former is actually breaking rock, and I prefer that they should be continuously engaged and the former carried by the latter in its reciprocating movements. This may be conveniently done, as shown, by providing the weight with a socket J′ and keyway $J^2$. The weight moves freely on the guides $I^4$ and is so shaped as to leave abundant room on each side, as indicated in Fig. 6, so that the air in the caisson will offer no substantial resistance to its free movement. As shown in Figs. 2 and 4, the weight J is attached to the lower end of a rod K, passing upward through the stuffing-box $I^3$ at the top of the caisson and connected at its upper end with the cross-head $K^2$, moving in the guideways $D^3$ $D^3$ of the derrick and to which in turn is connected a rope K′, passing over the pulley-wheel E and winding on the drum $C^{24}$. As shown in Fig. 7, the rod K is connected to a cross-head N, situated in the caisson above the weight J and like it moving in the guideways $I^4$. To this cross-head, which should be of considerable weight, is attached a catch or latching device, which when the cross-head moves down against the weight automatically engages the weight and which when the cross-head and weight are drawn up to the top of the caisson is automatically disengaged. A convenient construction is that shown in Fig. 7, in which two lever-arms $N^2$ $N^2$ are pivoted to the cross-head N, as indicated at N′ N′, and formed with hooked ends, as $N^3$, and rollers $N^4$ at their upper ends, a spring, as $N^5$, normally drawing the hooked ends apart. For this special construction of catch I form a recess $J^3$ in the top of the weight J, with lugs $J^4$ $J^4$ projecting over its edge. The upper faces $J^5$ $J^5$ of the lugs being inclined, it will be obvious that when the cross-head N moves down the hooked ends $N^3$ of the levers will engage the lugs $J^4$, so that when the cross-head is moved up the weight will be drawn upward with it until the rollers $N^4$ at the tops of the levers come in contact with the wedge $I^6$, whereupon the upper ends of the levers will be forced apart and the hooked ends forced together, releasing the weight and permitting it to fall. This construction has certain advantages in that the fall of the weighted chisel is not opposed by the frictional resistance offered to the downward motion of the rod K.

L indicates the chisel, secured in the socket J′ of the weigh[illegible] he key L′.

For certain purposes it is desirable to at times connect the weight J with the caisson, so that, for instance, the weight will be drawn up with the caisson or the caisson forced down by means of the weight. A convenient device for doing this consists of the rods M M, pivoted at M′ M′ onto the ring $I^5$ and formed with hooks at their free ends, as indicated at $M^2$. The rods or bars M are, as shown, connected together by rods *m*, and normally they lie in the position indicated in Fig. 4, being prevented from moving farther outward by a frame, such as $m^4$. When it is desired to couple the weight and caisson together, the bars M are moved in, so that their hooked ends engage the cross-head $K^2$, and they are secured in this location by a latch $M^3$, said latch being pivoted on one rod *m* and adapted to engage with the other rod *m*.

The operation of my device is readily followed. The caisson is lowered into the position at the point where the work is to be done, the weight J being coupled to the caisson to assist in lowering it, if desired, in the way above described. When brought to proper position, the clamp G is tightened, so as to hold the caisson against a tendency to rise, while giving it room to turn in the well or passage $C^2$. Compressed air is then forced in from the compressor $C^6$ through the pipes $O^2$ and O, the latter pipe being flexible and passing over a pulley O′, secured, as shown, on the cross-bars $d^2$ of the derrick. The hooked bars M M are released from the cross-head $K^2$ and the actuating mechanism then set to work to raise the weight J and the chisel attached to it and let it fall in the caisson. A simple and convenient device for doing this is the drum $C^{24}$, which is coupled to the shaft $C^{10}$ when the weight is to be raised and uncoupled when it is desired to drop the weight, or when the modification shown in Fig. 7 is used uncoupled and after the weight is drawn up and automatically released, so that the cross-head N will follow the weight down and reëngage it. The angle of the caisson and of the chisel L is adjusted from time to time by the engine $C^5$ acting through the connections described on the arm $G^6$ of the clamps.

Having now described my invention, what I claim as new, and desire to secure by Letters Patent, is—

1. A subaqueous rock-breaker consisting of a tubular caisson closed at top and open at bottom, in combination with a heavily-weighted chisel vertically movable in the tubular caisson, means for elevating the chisel in and dropping it through the caisson and means for forcing compressed air into the caisson to maintain it substantially free from water.

2. A subaqueous rock-breaker consisting of a tubular caisson closed at top and open at bottom, in combination with a heavy weight and a chisel both vertically movable in the tubular caisson, means for elevating the weight in and dropping it through the caisson and means for forcing compressed air into the caisson to maintain it substantially free from water.

3. A subaqueous rock-breaker consisting of a tubular caisson closed at top, in combination with a rock-breaking chisel, a heavy chisel-operating weight vertically movable in the tubular caisson, means for elevating said weight in and dropping it through the caisson, whereby rock-breaking energy may be developed and transmitted through the chisel to the rock, and means for compressing air in the caisson to maintain it substantially free from water.

4. A subaqueous rock-breaker consisting of a tubular shell, a rock-breaking chisel, means for maintaining said tubular shell substantially free from water, a movable chisel-operating weight working within the portion of said tubular shell that is free from water, and mechanism for causing said chisel-operating weight to reciprocate, whereby the said weight will operate the said chisel and so cause rock-breaking energy to be transmitted through the chisel to the rock.

5. A subaqueous rock-breaker consisting of a tubular caisson closed at top and open at bottom and provided with longitudinal guides, as $I^4$, in combination with a weight as J, movable on the guides in the caisson and adapted to hold a rock-breaking chisel in its lower end, means for elevating the weight in and dropping it through the caisson and means for forcing compressed air into the caisson to maintain it substantially free from water.

6. A subaqueous rock-breaker having in combination a tubular caisson closed at top and open at bottom, a weight adapted to hold a chisel longitudinally movable in said caisson, means for raising and dropping said weight and means for connecting the weight and caisson together at will.

7. A subaqueous rock-breaker having in combination a staging having an opening therethrough, a tubular caisson closed at top and open at bottom passing through opening, a weight adapted to hold a chisel longitudinally movable in said caisson, means for raising and dropping said weight and a clamp adapted to secure the caisson to the staging arranged as described to have a capacity to rotate with the caisson.

8. A framing or derrick, as D D′, having guides, as $D^9$ in combination with a tubular caisson arranged to extend down into water beneath said derrick, a weight vertically movable in the caisson and adapted to hold a rock-breaking chisel, a rod, as K, extending through a stuffing-box in the top of the caisson and adapted to connect with the weight aforesaid to raise it, a cross-head, as $K^2$, moving in the guides $D^3$ and connected to the top of rod K, a cord connected to said cross-head and leading over a pulley on the derrick to a hoisting-drum and means, as hook-arms M M, for connecting the top of the caisson to the cross-head $K^2$.

9. A framing or derrick, as D D′, having guides, as $D^3$, in combination with a tubular caisson arranged to extend down into water beneath said derrick, a weight vertically movable in the caisson and adapted to hold a rock-breaking chisel, a rod, as K, extending through a stuffing-box in the top of the caisson and adapted to connect with the weight aforesaid to raise it, a cross-head, as $K^2$, moving in the guides $D^3$ and connected to the top of rod K, a cord connected to said cross-head and leading over a pulley on the derrick to a hoisting-drum, means, as hook-arms M M, for connecting the top of the caisson to the cross-head $K^2$ and means, as clamp G, for holding the caisson in depressed position.

10. In a subaqueous rock-breaker, a tubular caisson closed at top and open at bottom in combination with a weight adapted to hold a chisel and longitudinally movable in said caisson, said weight having a catch-engaging device at its top, a catch situated in the caisson above the weight and also longitudinally movable therein, said catch being adapted to engage and hold the weight when forced against its top, means for moving the catch in the caisson and a catch-disengaging device situated at the top of the caisson and whereby the catch is made to disengage the weight when drawn upward to the disengaging device.

In testimony whereof I have signed my name to this specification, in the presence of two subscribing witnesses, on this 12th day of May, 1906.

BARTON H. COFFEY.

In presence of—
GEO. L. WHEELOCK,
IVAN L. C. GOODING.